United States Patent
Hoptroff et al.

(10) Patent No.: US 11,965,971 B2
(45) Date of Patent: Apr. 23, 2024

(54) SYSTEMS FOR TIMESTAMPING EVENTS ON EDGE DEVICES

(71) Applicant: HOPTROFF LONDON LIMITED, London (GB)

(72) Inventors: Richard Hoptroff, London (GB); Simon Kenny, London (GB); Rabindranath Sewoke, London (GB)

(73) Assignee: HOPTROFF LONDON LIMITED, London (GB)

( * ) Notice: Subject to any disclaimer, the term of this patent is extended or adjusted under 35 U.S.C. 154(b) by 57 days.

(21) Appl. No.: 17/560,038

(22) Filed: Dec. 22, 2021

(65) Prior Publication Data

US 2022/0120915 A1   Apr. 21, 2022

Related U.S. Application Data

(63) Continuation of application No. PCT/US2020/044595, filed on Jul. 31, 2020.

(30) Foreign Application Priority Data

Aug. 8, 2019 (GB) .................................. 1911378

(51) Int. Cl.
*G01S 19/25* (2010.01)
*H04J 3/06* (2006.01)

(52) U.S. Cl.
CPC .......... *G01S 19/256* (2013.01); *H04J 3/0655* (2013.01); *H04J 3/0682* (2013.01)

(58) Field of Classification Search
None
See application file for complete search history.

(56) References Cited

U.S. PATENT DOCUMENTS

| | | | |
|---|---|---|---|
| 6,470,031 B1 | 10/2002 | Loy et al. | |
| 7,080,160 B2 * | 7/2006 | Cognet | H04L 9/40 709/248 |
| 8,416,812 B2 | 4/2013 | Radulescu | |
| 8,630,315 B2 | 1/2014 | Rivaud et al. | |
| 8,938,636 B1 | 1/2015 | Hochschild et al. | |

(Continued)

FOREIGN PATENT DOCUMENTS

| | | |
|---|---|---|
| WO | WO-2018067817 A1 | 4/2018 |
| WO | WO-2021026023 A1 | 2/2021 |

OTHER PUBLICATIONS

EP20850885.3 European Search Report and Opinion dated Aug. 2, 2023.

(Continued)

*Primary Examiner* — Gregory B Sefcheck
(74) *Attorney, Agent, or Firm* — Wilson Sonsini Goodrich & Rosati (57) ABSTRACT

The present disclosure provides systems and methods for timestamping events on edge devices. A trusted source measures the latency to the edge device and the edge device's clock offset, and stores the information at the trusted source for later use. The trusted source sends the latency and the device's clock offset to the edge device for later use. The trusted source or the edge device adjusts a timestamp generated at the edge device using an estimated clock offset. The estimated clock offset is determined by extrapolation or interpolation from measured clock offsets.

20 Claims, 4 Drawing Sheets

(56) References Cited

U.S. PATENT DOCUMENTS

| | | | |
|---|---|---|---|
| 9,178,637 B2 | 11/2015 | Aweya | |
| 9,667,370 B2* | 5/2017 | Tzeng | H04L 12/56 |
| 10,411,793 B1* | 9/2019 | Ramsey | H03M 13/09 |
| 10,608,829 B1* | 3/2020 | Yoshihama | H04L 43/0858 |
| 10,623,173 B1* | 4/2020 | Geng | H03L 7/087 |
| 2003/0109264 A1* | 6/2003 | Syrjarinne | H04W 64/00 370/350 |
| 2005/0207387 A1* | 9/2005 | Middleton | H04J 3/0664 370/347 |
| 2005/0286564 A1* | 12/2005 | Hatley | H04L 43/106 370/503 |
| 2009/0249405 A1* | 10/2009 | Karaoguz | H04N 21/2343 725/62 |
| 2009/0249413 A1* | 10/2009 | Karaoguz | H04N 21/41407 725/105 |
| 2009/0249422 A1* | 10/2009 | Chen | H04N 21/4627 725/116 |
| 2009/0249424 A1* | 10/2009 | Gordon | H04N 21/4524 348/553 |
| 2009/0276542 A1* | 11/2009 | Aweya | H03L 7/08 709/248 |
| 2010/0279732 A1* | 11/2010 | Hjelm | G01S 19/30 455/552.1 |
| 2012/0300859 A1* | 11/2012 | Chapman | H04J 3/0664 375/257 |
| 2014/0177653 A1* | 6/2014 | Tzeng | H04J 3/0673 370/503 |
| 2014/0198784 A1* | 7/2014 | Nakajima | H04W 56/005 370/350 |
| 2015/0071309 A1 | 3/2015 | Aweya et al. | |
| 2016/0170439 A1* | 6/2016 | Aweya | H04L 69/28 713/401 |
| 2016/0211936 A1* | 7/2016 | Bottari | H04L 41/12 |
| 2016/0309434 A1* | 10/2016 | Regev | H04L 43/106 |
| 2016/0359711 A1* | 12/2016 | Deen | H04L 41/0893 |
| 2017/0041126 A1* | 2/2017 | Bergeron | H04L 7/0012 |
| 2017/0111483 A1* | 4/2017 | Wang | H04L 47/12 |
| 2017/0237512 A1* | 8/2017 | Galea | H04J 3/0644 370/350 |
| 2018/0076949 A1* | 3/2018 | Mayer | H04B 10/40 |
| 2018/0227080 A1* | 8/2018 | Stein | H04N 21/4305 |
| 2018/0253463 A1* | 9/2018 | Bastawala | G06F 15/76 |
| 2019/0089716 A1* | 3/2019 | Stöcker | H04L 67/1078 |
| 2019/0260568 A1* | 8/2019 | Pepper | H04L 7/0008 |
| 2019/0319868 A1* | 10/2019 | Svennebring | H04L 41/147 |
| 2020/0044760 A1* | 2/2020 | Seed | H04J 3/0658 |
| 2020/0112444 A1* | 4/2020 | Yoshihama | H04L 9/3297 |
| 2020/0153527 A1* | 5/2020 | Matsunaga | H04J 3/0664 |
| 2020/0186584 A1* | 6/2020 | Srinivasan | H04L 43/106 |
| 2020/0244382 A1* | 7/2020 | Regev | H04J 3/0661 |
| 2020/0247412 A1* | 8/2020 | Wang | G02B 27/01 |
| 2020/0249039 A1* | 8/2020 | Lassoued | G01C 21/20 |
| 2020/0322246 A1* | 10/2020 | Wang | H04L 43/0858 |
| 2020/0382155 A1* | 12/2020 | Chiummiento | H04B 3/54 |
| 2020/0382400 A1* | 12/2020 | Saka | G06Q 20/10 |
| 2020/0396051 A1* | 12/2020 | Geng | H04L 7/033 |
| 2022/0272046 A1* | 8/2022 | Harmatos | H04L 43/0852 |
| 2023/0028255 A1* | 1/2023 | Shah | H04L 9/3234 |

OTHER PUBLICATIONS

PCT/US2020/044595 Search Report & Written Opinion dated Nov. 17, 2020.

Selgas, B. Clock Synchronization Error Measurement Techniques for RBIS. Thesis (Master thesis), E.T.S.I. Industriales (UPM). Politecnico Di Torino, Apr. 2015, pp. 1-80.

Solomon et al.. Latency Determination and Compensation on Real-Time GNSS/INS Integrated Navication Systems. International Archives of the Photogrammerty, Remote sensing and Spatial Information Sciences, Sep. 16, 2011, pp. 303-307.

\* cited by examiner

SYSTEMS FOR TIMESTAMPING EVENTS ON EDGE DEVICES

CROSS-REFERENCE

This application is a continuation of International Patent Application No. PCT/US2020/044595 filed Jul. 31, 2020, which claims priority to GB Application No. GB1911378.6 filed on Aug. 8, 2019, which is entirely incorporated herein by reference.

BACKGROUND

Accurate clock synchronization for frequency, phase and time of day plays a critical role for timestamping events on edge devices. An example is MiFID II directive RTS 25, which requires that timestamps used to record financial transactions with a time accuracy within specified bounds. However, it can be challenging to synchronize the local clocks to trusted time sources (e.g., NPL (Teddington), NIST (Boulder, CO), Rosstandart (Moscow), etc.). For example, a local clock's oscillator frequencies may vary according to physical effects, such as temperature changes. As the relay of synchronization information occurs relatively infrequently, a timestamp generated at later time point may suffer from inaccuracies accumulated during the time lapse since last synchronization.

SUMMARY

Recognized herein is a need for methods and systems that can inexpensively, quickly and accurately synchronize clocks. Methods and systems of the present disclosure may be capable of synchronizing time between a time source and a local time source at an edge device and accurately timestamping events on the edge device. Methods and systems of the present disclosure may advantageously utilize the techniques of traceable time, network (e.g., round-trip) latency to determine an accurate clock offset for correcting a timestamp. The corrected/accurate timestamp is provided irrespective of the physical conditions or environment (e.g., temperature and voltage) that influence the free running frequency of an oscillator of the local clock.

An aspect of the present disclosure provides systems and methods for timestamping events on edge devices. A trusted source measures the latency to the edge device and the edge device's clock offset, and stores the information at the trusted source for later use. The trusted source sends the latency and the device's clock offset to the edge device for later use. The trusted source or the edge device adjusts a timestamp generated at the edge device using an estimated clock offset. The estimated clock offset is determined by extrapolation or interpolation from measured clock offsets.

The present disclosure provides a method for generating a timestamp. The method comprises: (a) receiving a first time signal from a first time source at a first time; (b) determining a transmission latency for the first time signal; (c) calculating a corrected time for receiving the first time signal; (d) calculating a clock offset between the first time source and a second time source at the first time, wherein the clock offset is calculated based on the corrected time and a second time signal generated by the second time source; (e) receiving a request for generating a timestamp for an event occurred at the first time; and (f) generating a corrected timestamp based on the timestamp and the clock offset determined in (d).

In some embodiments of the present disclosure, the first time source is a trusted time source that comprises a grandmaster clock receiving a GNSS or GPS time signal. In some cases, (a)-(f) of the method is performed at the second time source. In some cases, the corrected timestamp is generated using the second source. In some cases, the second time source is a local clock that is not synchronized to the trusted time source. In some instances, the method further comprises generating a hash code for the timestamp, the corrected timestamp, the transmission latency, the clock offset and the event, and recording the hash code to a ledger.

In some embodiments, the second time source is a trusted time source and (a)-(d) are performed at the second time source. In some cases, the corrected timestamp is generated using the first time source.

In some embodiments, the method further comprises receiving a second request for generating a second timestamp at a second time, and determining an estimated clock offset for generating a corrected second timestamp. In some cases, the estimated clock offset is an interpolated or extrapolated value based on two or more previously calculated clock offsets. In some cases, the estimated clock offset is determined using a machine learning algorithm trained model.

In a related yet separate aspect of the disclosure, a system is provided for generating a timestamp. The system comprises: a network of two or more nodes, wherein at least a first node is at a first time source and a second node is at a second time source and the two or more nodes are configured to: (a) receive a first time signal from the first time source at a first time; (b) determine a transmission latency for the first time signal; (c) calculate a corrected time for receiving the first time signal; (d) calculate a clock offset between the first time source and the second time source at the first time, wherein the clock offset is calculated based on the corrected time and a second time signal generated by the second time source; (e) receive a request for generating a timestamp for an event occurred at the first time; and (f) generate a corrected timestamp based on the timestamp and the clock offset determined in (d).

In some embodiments of the system, the first time source is a trusted time source that comprises a grandmaster clock receiving a GNSS or GPS time signal. In some cases, (a)-(f) are performed by the second node. In some cases, the corrected timestamp is generated by the second node. In some cases, the second time source is a local clock that is not synchronized to the trusted time source.

In some embodiments, the first node or the second node is further configured to generate a hash code for the timestamp, the corrected timestamp, the transmission latency, the clock offset and the event, and recording the hash code to a ledger. In some embodiments, the second time source is a trusted time source and (a)-(d) are performed by the second node. In some cases, the corrected timestamp is generated using the first time source.

In some embodiments, the two or more nodes are further configured to receive a second request for generating a second timestamp at a second time, and determine an estimated clock offset for generating a corrected second timestamp. In some cases, the estimated clock offset is an interpolated or extrapolated value based on two or more previously calculated clock offsets. In some cases, the estimated clock offset is determined using a machine learning algorithm trained model.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Certain Definitions

Unless otherwise defined, all technical terms used herein have the same meaning as commonly understood by one of ordinary skill in the art to which this invention belongs.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," "entity" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The edge device can be any end device or a node of a network. The one or more nodes of the network can be various types of computing devices such as personal computers, tablet computers, smart phones, set top boxes, desktop computers, laptops, gaming systems, servers, data centers, and various other devices or systems. A plurality of other devices or components can establish a connection through the network. A node may be any device equipped with communication capabilities. The communications may be wired or wireless communications. The node may be operating over various technologies such as Worldwide Interoperability for Microwave Access (WiMAX) and infrastructure IEEE 802.11 variants, such as IEEE 802.11a/b/g/n/ac, Global System for Mobile communication (GSM), Universal Mobile Telecommunications System (UMTS), High Speed Downlink Packet Access (HSDPA), Code Division Multiple Access (CDMA), Long Term Evolution (LTE), and various others as described elsewhere herein. In some cases, a node may be a Bluetooth or Wi-Fi enabled device, such as laptops, cellular phones, Personal Digital Assistant (PDA), Smartphone, HSDPA terminal, CSMA terminal and various other access terminals.

Embodiments of the invention may be used in a variety of applications. Some embodiments of the invention may be used in conjunction with various devices and systems, for example, an electronic device such as camera, automotive devices, vehicles, a personal computer (PC), a desktop computer, a mobile computer, a laptop computer, a notebook computer, a tablet computer, a server computer, a handheld computer, a handheld device, a personal digital assistant (PDA) device, a handheld PDA device, a wireless communication station, a wireless communication device, a wireless access point (AP), a modem, a network, a wireless network, a local area network (LAN), a virtual local area network (VLAN), a wireless LAN (WLAN), a metropolitan area network (MAN), a wireless MAN (WMAN), a wide area network (WAN), a wireless WAN (WWAN), a personal area network (PAN), a wireless PAN (WPAN), a virtual private network (VPN), a storage area network (SAN), a frame relay connection, an Advanced Intelligent Network (AIN) connection, a synchronous optical network (SONET) connection, devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or long term evolution (LTE) of the above standards, units and/or devices which are part of the above networks, one way and/or two-way radio communication systems, cellular radio-telephone communication systems, a cellular telephone, a wireless telephone, a personal communication systems (PCS) device, a PDA device which incorporates a wireless communication device, a multiple input multiple output (MIMO) transceiver or device, a single input multiple output (SIMO) transceiver or device, a multiple input single output (MISO) transceiver or device, or the like.

It is noted that various embodiments can be used in conjunction with one or more types of wireless or wired communication signals and/or systems, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, multi-carrier modulation (MDM), discrete multi-tone (DMT), Bluetooth®, ZigBee™, or the like. Embodiments of the invention may be used in various other devices, systems, and/or networks.

Clocks in a network are typically organized into a master-slaves hierarchy, and clock synchronization may be conducted by communicating synchronization messages among nodes to synchronize the slave clocks with a master clock. For example, synchronization standards or protocols such as Precision Time Protocol (PTP) may communicate frequency, phase and time-of-day information from a master clock to one or more slave clocks with sub-microsecond accuracy.

The synchronization protocols (e.g., Network Time Protocol (NTP), PTP) are generally packet-based methods that transfer time and frequency references using packets containing time stamps that identify the times of departure/arrival of packets. PTP and NTP can distribute timing and frequency alignment throughout a network in a point-to-point fashion. The delay spent in carrying a master clocks time stamp to a slave clock may then affect the accuracy of clock synchronization. Both PTP and NTP compensate for the delay incurred by transmission over the Ethernet by sending a timed message in both directions, allowing a round-trip delay to be measured.

Figure 1:
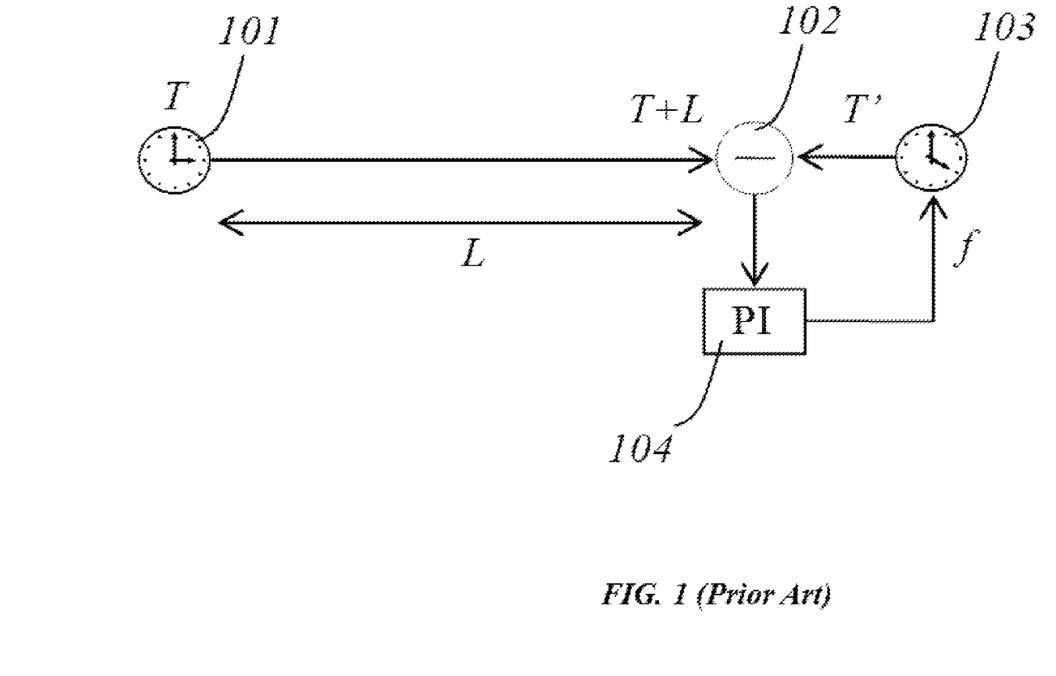
FIG. 1 schematically shows an example of synchronizing clocks.

FIG. 1 schematically shows an example of synchronizing clocks. The illustrated system may comprise at least a transmission path between a time server node 101 and a time receiver node 102. The time server node and the time receiver node can be any suitable network components. For instance, the time server node 101 and time receiver node 102 may be nodes of a communication network and a propagation delay or transmission latency L may be determined for a transmission from the time server A to the time receiver B.

In some cases, time server A may be capable of receiving time signals from global navigational satellites systems ("GNSS") such as GPS or GLONASS using a grandmaster clock. The time receiver B may comprise a slave clock to be synchronized with the grandmaster clock or to receive a time service. A time server may also be referred to as time source which are used interchangeably throughout the specification unless context suggests otherwise. The slave clock at time receiver B may also be referred to as a local time source. A packet stamped with a source time T may be transmitted from the time server A 101 to the time receiver B (edge device) 102 using a mechanism such as Network Time Protocol (NTP) or Precision Time Protocol (PTP) as described above. The packet with the trusted time may be received by the edge device 102 at a corrected time T+L adjusted for the calculated transmission latency L.

Traditionally, upon determining a difference in time between the external (i.e. reference) signal and the local signal, the endpoint slaves may utilize a clock steering algorithm (also known as a servo algorithm) to minimize the clock offset. The difference in time is integrated by a digital accumulator in order to compute the time error, which finally drives a Proportional Integral (PI) controller adjusting the clock rate. If the local clock does not possess a high stability local oscillator, steering can be required frequently.

As shown in the example, the clock steering algorithm may minimize the clock offset O, which is the difference between the trusted time received at the device 102 T+L and the local time T' of the edge device's local clock 103. A controller such as a Proportional Integral (PI) controller 104 may be configured to adjust the rate/frequency of the oscillator of the local clock 103 to minimize an absolute value of the clock offset $O=T'-L-T$.

The local clock 103 may then be used to timestamp events that occur at the edge device 102. In some cases, if proof is required that the local clock at the edge device 102 is correctly synchronized, the edge device may record the clock offset O for the proofed time period.

In some cases, the edge device may include or be coupled to a timestamping machine that is configured to timestamp events in response to a timestamp request. The timestamping machines may use the clock servo algorithm to ensure their clocks are synchronized to one or more trusted time sources such as global navigational satellites systems (e.g., GPS or GLONASS), NIST or NPL (Teddington).

However, the traditional clock synchronization approaches may have several limitations. For example, adjusting the rate/frequency and/or phase, shift of the oscillator of the local clock may not be permitted due to the lack of privilege (e.g., root privilege is required on Linux system). In another example, the edge device may not have the resources to keep a record of the degree of synchronization or may not have the capability to request/initiate clock synchronization. Additionally, the created timestamp may not be accurate due to the variation of the oscillator rate/frequency that lock rate that depends on various parameters such as the supply voltage, environmental temperature and humidity, vibration and/or shock.

In an aspect of the present disclosure, a method is provided for determining the clock offset and latency of the transmission of a time signal. The method may comprise: a) receiving a time signal at a first time from a time source; b) calculating the latency of the received time signal; c) calculating a corrected time using the received time signal and the transmission latency; d) calculating a clock offset at the first time using the corrected time and a second, locally generated, time signal from a second time source; and e) determining if a timestamp is generated at the first time, and if so, calculating a corrected timestamp using the generated timestamp and the clock offset at the first time.

In some cases, if a second timestamp is requested at a second time, an estimated clock offset for the second time may be determined and the second timestamp may be corrected using the estimated clock offset at the second time. This may beneficially provide a timestamp corrected using a measured or estimated clock offset without requiring steering/adjusting the edge device's local clock or without requiring a high stability local oscillator.

Figure 2:
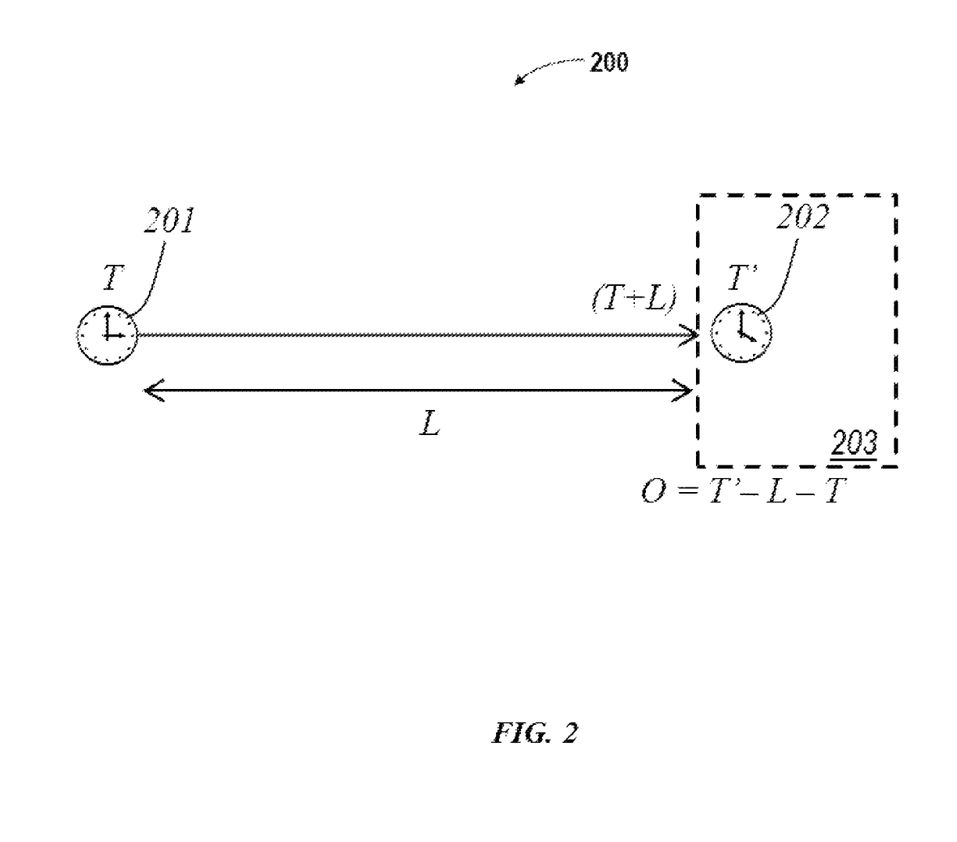
FIG. 2 schematically illustrates a system for generating a corrected timestamp, in accordance with some embodiments of the present disclosure.

FIG. 2 schematically illustrates a system 200 for generating a corrected timestamp, in accordance with some embodiments of the present disclosure. In the illustrated example, the clock offset between the local clock 202 and a remote trusted source 201 may be determined by the edge device 203 based on a transmission latency between the trusted source 201 and the edge device 203/local clock 202. The edge device 203 may generate timestamps corrected using the clock offset.

The trusted source 201 can be same as the time server node as described in FIG. 1. For example, the trusted source 201 may be NIST or NPL or include a grandmaster clock (i.e., clock receiving time signals from global navigational satellites systems ("GNSS") such as GPS or GLONASS). The edge device can be any suitable network components as described elsewhere herein. In the illustrated example, the edge device may be configured to determine the transmission latency, calculate the clock offset and generate an estimated clock offset in response to a timestamping request.

In the illustrated example, the time server node 201 may send a packet stamped with time T to the edge device 203 using a time delivery process. The edge device 203 may receive the packet at time T' based on to the local clock 202.

The time server node 201 may transmit the trusted time T at a pre-determined frequency or rate. In some cases, a clock offset between the trusted time T and the local time T' is calculated upon receiving a packet (with reference/trusted time T) from the time server node. In some cases, if an event occurs in a time interval between two adjacent transmissions of trusted time T, an estimated clock offset for stamping the event at the edge device may be determined using interpolation or other suitable mathematical relationship/model. In some cases, if an event occurs after the receipt of the last received trusted time T, an estimated clock offset for stamping the event at the edge device may be determined using extrapolation or other suitable mathematic relationship/model.

The edge device 203 may calculate the transmission latency L for transmitting the packet from the time source 201 to the edge device using a synchronization protocol such as Network Time Protocol (NTP) or Precision Time Protocol (PTP) as described above. Next, the edge device may generate a corrected time T+L at which the packet is received using the transmission latency.

The clock offset $O_1$ at time $T'_1$, may be calculated using the corrected time and the local time such that $O_1=T'_1-L_1-T_1$, and the clock offset may be recorded at the edge device 203. The clock offset $O_1$ is positive if the local clock 202 is fast, and negative if it is slower than the time source. Similarly, a clock offset $O_0$ can be calculated for time $T_0$.

The edge device 203 or the local clock 202 may or may not adjust the local clock frequency using a steering algorithm. In some cases, if the edge device or the local clock is provided with the capability of adjusting the rate of the oscillator, the local clock's frequency may be adjusted to minimize the clock offset O over a time period as described in FIG. 1. Alternatively, the local clock 202 may not be adjusted.

If a timestamp is requested for an event at $T'_2$, the edge device 203 may calculate an estimated clock offset $O_2$. The clock offset $O_2$ may be extrapolated from the two or more recently determined values such as $O_0$ and $O_1$. As an example, the estimated clock offset $O_2=O_1+(O_1-O_0)(T'_2-T'_1)/(T'_1-T'_0)$, where $T'_0$, $T'_1$, $T'_2$ are the local time signals provided by the local clock 202, and $O_0$, $O_1$ are the clock offset at the time $T'_0$, $T'_1$, respectively.

Any suitable methods can be utilized to estimate the clock offset. It should be noted that the linear extrapolation is just an example. Various other models or relationships can be utilized to estimate the clock offset at a later time based on the previous clock offsets and local time, or estimate the clock offset for a time fall between two adjacent transmissions of trusted time signals (or two measured clock offsets). For example, a mathematic model may be established for estimating a clock offset at a future time or a time between two adjacent transmissions of trusted time signals (or two measured clock offsets).

The mathematic model may be a linear or non-linear model. In some cases, the mathematic model may be a function based on the previously calculated clock offsets and local times. For example, the mathematic model may be a linear/non-linear regression fit of the previously obtained clock offsets and local times.

In some cases, the mathematic model may include one or more parameters that may be related to a condition of the network traffic (e.g., influence the transmission latency, traffic loading variations, etc.), and/or the conditions at the edge device/local clock (e.g., conditions that may influence the oscillator frequency, drift, etc.).

In some cases, the model for estimating the clock offset may be a predictive model trained using machine learning algorithm. Artificial intelligence, such as machine learning algorithms, may be used to train the predictive model. A machine learning algorithm may be a neural network, for example. Examples of neural networks include a deep neural network, convolutional neural network (CNN), and recurrent neural network (RNN). In some cases, a machine learning algorithm trained model may be pre-trained and implemented on the system, and the pre-trained model may undergo continual re-training that involves continual tuning of the predictive model or a component of the predictive model (e.g., classifier) to adapt to changes in the implementation environment over time (e.g., changes in the edge device/event data, available labeled data, model performance, etc.).

Different edge devices and/or local clocks and different transmission paths may or may not adopt the same model or method for estimating the clock offset. In some cases, the clock offset $O_2$ may be estimated using the most recent offset value, e.g., $O_1$.

Figure 3:
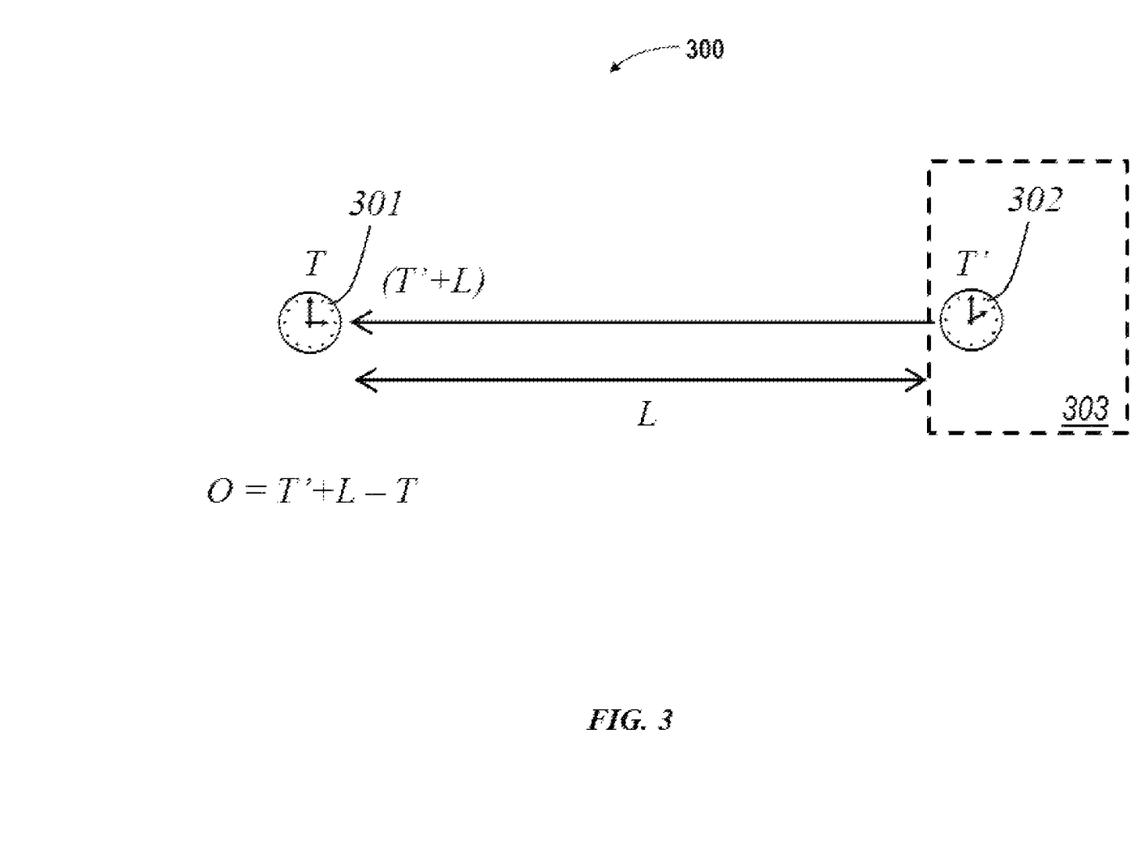
FIG. 3 schematically illustrates a system for generating a corrected timestamp, in accordance with some embodiments of the present disclosure.

In some embodiments, the clock offset and transmission latency may be determined by the trusted source or the time serving node. The clock offset or an estimated clock offset may be determined by the trusted source and can be used to correct a timestamp for stamping an event occurred at the edge device. FIG. 3 schematically illustrates a system 300 for generating a corrected timestamp, in accordance with some embodiments of the present disclosure. As shown in the example, a clock offset between the local clock 302 and a remote trusted source 301 may be determined by the trusted source 301 based on a transmission latency between the trusted source 301 and the edge device 303. The edge device 303 may generate timestamps corrected using the clock offset. The timestamp may be corrected by the edge device 303 or the trusted source 301.

The trusted source 301 can be same as the time server node as described in FIG. 1 or FIG. 2. For example, the trusted source 301 may be NIST or NPL or include a grandmaster clock (i.e., clock receiving time signals from global navigational satellites systems ("GNSS") such as GPS or GLONASS). The edge device can be any suitable network components as described elsewhere herein.

In the illustrated example, the edge device 303 may send a packet stamped with local time $T'_1$ to the time serving node 301 using a time delivery process as described elsewhere herein. The time serving node 301 may receive the packet at time $T_1$ based on the trusted time source.

The time serving node 301 may calculate the latency L for transmitting the packet from the edge device 303 to the time serving node 301 using a synchronization protocol such as Network Time Protocol (NTP) or Precision Time Protocol (PTP) that is available to the time serving node. The time serving node 301 may generate a corrected time $T'_1+L$ at which the packet is received.

The clock offset $O_1$ at time $T_1$, may be calculated as $O_1=T'_1+L_1-T_1$, and is recorded at the time serving node 301. $O_1$ is positive if the local clock 302 is fast, and negative if it is slower than the trusted time source. Similarly, a clock offset $O_3$ can be calculated for time $T_3$.

In optional cases, the time serving node 301 may send the clock offset information $O_1$ back to the edge device 303. The edge device 303 or the local clock 302 may or may not adjust the local clock frequency based on the clock offset information $O_1$ using a steering algorithm. In some cases, if the edge device or the local clock is provided with the capability of adjusting the rate of the oscillator, the local clock's frequency may be adjusted to minimize the clock offset over a time period as described in FIG. 1 or FIG. 2. Alternatively, the local clock 302 may not be adjusted.

If a timestamp is requested for an event at $T'_2$ that is subsequent to $T'_1$, the edge device 303 may send the timestamp $T'_2$ to the time serving node 301. The time serving node 301 may generate a corrected timestamp $T_2$ using an estimated clock offset $O_2$. The time serving node 301 may record the timestamp $T_2$ for the event. Alternatively, the timestamp $T_2$ may be sent back to the edge device 303 and recorded by the edge device.

The estimated clock offset $O_2$ can be calculated using the algorithm and methods as described above. For example, the recently calculated clock offset $O_1$ may be used as the clock offset $O_2$ assuming the clock offset is a constant. Alternatively, the clock offset $O_2$ may be interpolated using two adjacent measured clock offset values $O_1$ and $O_3$. As an example, the estimated clock offset can be calculated as $O_2=O_1+(O_3-O_1)(T_2-T_1)/(T_3-T_1)$, where $T_1$, $T_2$, $T_3$ are the time generated by the time serving node 301, and $O_1$, $O_3$ are the clock offsets determined for the respective time $T_1$, and $T_3$.

The timestamping mechanism and clock synchronization methods of the present disclosure can be implemented in various applications. Timestamping mechanism of the present disclosure may permit the time serving node, the edge device or a combination of both to calculate a clock offset and generate a corrected timestamp upon a request which provides flexibility in implementation and scaling. This may beneficially allow for the edge device and the time serving node/trusted source to timestamp an event based on existing software/hardware conditions regardless the capability of adjusting the physical local clock.

In an example, the time receiving node or end node may be a computing device (e.g., Linux computer) comprising a timestamping application programming interface (API). The timestamping API may determine the system clock offsets relative to a trusted source using the methods as described above without the need to correct the system clock. When an application requests a timestamp, the timestamping API may return a timestamp corrected using a clock offset that is calculated or estimated using the method and algorithm as described in FIG. 2.

Figure 4:
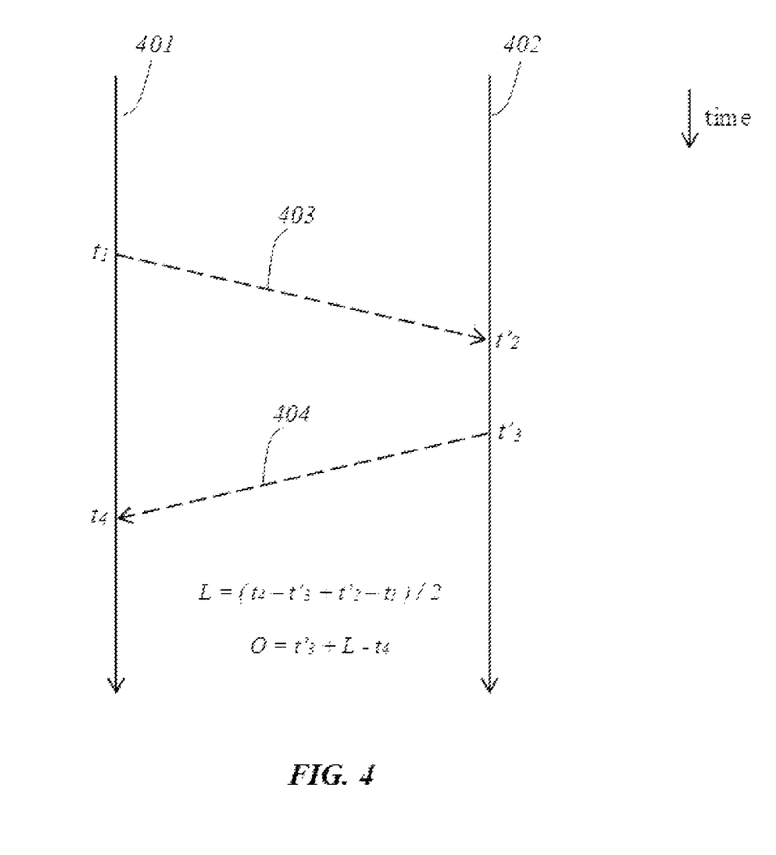
FIG. 4 shows timing diagram that indicates how latency is determined first by timing a message being sent from a remote trusted device to a local device, and then from the local device to the remote trusted device.

In another example, the trusted source or time serving node may operate as a web server that measures time on a web browser (i.e., end node or time receiving node) comprising an internal clock. The web server may utilize a synchronization process that is similar to unicast software PTP time synchronization. For example, the synchronization process may be implemented in JavaScript, where the Sync and Delay Request-type messages are used. FIG. 4 shows an example of a synchronization process.

At time $t_1$ the trusted source 401 sends a Sync message 403 to a subscribing device 402 (edge device), which records the time $t'_2$ that the Sync message 403 is received.

The edge device 402 may then send a Delay Request-type message 404 at time $t'_3$, which includes both $t'_2$ and $t'_3$, to the trusted source 401. The trusted source 401 receives the message 404 at time $t_4$. The trusted source 401 may calculate the transmission latency L based on $t_1$, $t'_2$, $t'_3$ and $t_4$, using below exemplary equation:

$$L=(t_4-t'_3+t'_2-t_1)/2$$

The trusted source 401 may calculate the clock offset O using below exemplary equation:

$$O=t'_3+L-t_4$$

In some cases, the transmission latency and the clock offset may be transmitted to the web browser for generating corrected timestamps. In some cases, the transmission latency and the clock offset may be transmitted along with a hash value. The hash value may be used to ensure that the recorded event information and timestamps are traceable and immutable. For instance, the hash code may be combined by hash coding ('hash-combined') with the previous hash code to generate a hash-chain of a series of hash codes. A sequence of events and the timestamps information may be recorded in the order indicated by the resulting series of hash codes. By making the resulting hash code available for inspection ('publishing') from time to time, the sequence of timestamps in the ledger of the edge device can be difficult to dispute ('immutable').

As an example, the event may be a user taking an action that needs to be traceably verified, such as performing online transaction, or clicking to agree to accept the cookies. The provided system may record in a cookie: the hash code, for immutability of identity of the event; the local time record of when the event happened; the clock offset O, to render the local time record traceable to Universal Coordinated Time (UTC), and the transmission latency L as the immutable evidence of the geolocation of the node. The provided systems and methods may employ blockchain techniques to ensure the immutability of the traceable time, location and identity of an event. The sequence of events may be bundled into blocks and every block (except for the first block) refers back to or is linked to a prior block in the chain. The integrity (e.g., confidence that a previously recorded event has not been modified) of the entire chain of events is maintained because each block refers to or includes a cryptographic hash value of the prior block. A hash-combination may be non-commutative (e.g., J hash-combined with K gives a different result than K hash-combined with J).

The present disclosure may employ methods and systems of providing timestamp machines with traceable time and ensuring the immutability of the traceable time, location and identity of an event. In optional embodiments of the present disclosure, a watermarking system may be provided which employs a unique proofing scheme to verify (and even guarantee) that the time, location and identity of an event are true as it claims. The watermarking system may comprise a network of timestamping machines with improved accuracy and security. The timestamping machine may be a beacon node or edge device as described above that is configured to establish a chain of events with proofed time, location and/or identity. Alternatively or in addition to, the timestamping machine may be the trusted time source.

The one or more timestamping machines may be edge devices or time sources that can receive timestamp/watermark requests from other nodes or components (e.g., requesting node) in the network, generate a trusted timestamp (corrected timestamp) as described above and store the proofed time and event data in a hash-chained ledger. For example, the one or more timestamping machines may be edge devices or time sources that can generate accurate or corrected timestamps using the methods as described above. The one or more timestamping machines may generate hash codes of time and record the hash codes into a chain of hash codes.

In some cases, the network of timestamping machines may record or add traceable timestamps into a hash-chain at regular intervals, so that the hash-chain is immutable in absolute time rather than just sequence. The timestamping machines' locations may be known and can be audited at regular intervals. In some cases, the timestamping machines may audit each other's time, place and identity traceability by sending out timestamping request to the other nodes.

In some cases, the timestamping machines may also prove the location claimed by a requesting node for an event. The timestamping machine may utilize network latency information for transmitting a data packet along a transmission path between the requesting node and the timestamping machine to derive the location/distance of the requesting node. For example, round-trip delay and/or route information along a transmission path between the requesting node and the timestamping machine may be used to estimate the location or a location vector of the requesting node as claimed. In some cases, the estimated location vector may be used to determine the likelihood that the location claimed by the requesting node is true. The timestamping machines may be located securely so their locations (e.g., fixed location) can be assured. In some cases, multiple timestamping machines may collectively prove the location of a requesting node for additional certainty of the location.

The network of timestamping machines (e.g., edge devices, time sources) may form a secured and distributed ledger of events which is immutable in time, place and identity. In some cases, the ledger information may be provided to the requesting entity (e.g., requesting node/device) allowing the requesting entity to create a watermark for the event. The requesting node may be an edge device that may or may not be synchronized to a trusted time source.

Although only one end node and one trusted source are illustrated in the figures, it should be noted that an end node may be in communication with multiple time sources for timestamping events. Similarly, a trusted source may be communication with multiple edges devices for clock synchronization, generating corrected timestamps and performing various other operations as described herein.

Various methods or components (e.g., beacon node, requesting node) of the present disclosure may be implemented by software, hardware or a combination of both. The provided system can have one or more processors and at least one memory for storing program instructions. The processors may be located at the time receiver or time source. The processors may be part of the receiver or source. Alternatively, the processors may be located remote to the receiver or source. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the algorithms for calculating the estimated error in accuracy or performing time distribution testing can be implemented in hardware components (e.g., ASICs, special purpose computers, or general purpose computers), software or combinations of hardware and software While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for generating a trusted timestamp comprising:
   (a) receiving, at an edge device, a first time signal from a trusted time source at a first time;
   (b) transmitting, by the edge device, a message back to the trusted time source at a second time, wherein the message comprises the first time and the second time;
   (c) determining a transmission latency between the trusted time source and the edge device based at least in part on the first time signal, the first time, the second time, and a third time at which the message is received by the trusted time source;
   (d) calculating, by the trusted time source, a clock offset between the trusted time source and a local time source at the edge device, wherein the clock offset is calculated based on the transmission latency determined in (c), the second time and the third time;
   (e) transmitting, from the trusted time source to the edge device, the clock offset calculated in (d) and the transmission latency determined in (c) along with a hash code; and
   (f) generating, by the local time source at the edge device, a trusted timestamp for an event occurred at a fourth time, wherein the trusted timestamp is generated based at least in part on the clock offset received in (e) and the fourth time.

2. The method of claim 1, wherein the trusted time source comprises a grandmaster clock receiving a GNSS or GPS time signal.

3. The method of claim 1, wherein the local time source is not synchronized to the trusted time source.

4. The method of claim 1, further comprising recording the hash code to a ledger.

5. The method of claim 4, further comprising recording a location of the event and an identity of the event to the ledger.

6. The method of claim 5, wherein the location of the event is proved based at least in part on a transmission latency between a node requesting the timestamp and the edge device.

7. The method of claim 1, further comprising receiving a request for generating a timestamp to timestamp an event occurred at a fifth time, and determining an estimated clock offset for generating a trusted timestamp for the event occurred at the fifth time.

8. The method of claim 7, wherein the estimated clock offset is an interpolated or extrapolated value based on two or more previously calculated clock offsets.

9. The method of claim 7, wherein the estimated clock offset is determined using a machine learning algorithm trained model without requiring time signals from the trusted time source at the fifth time.

10. The method of claim 7, wherein the estimated clock offset is determined based at least in part on a condition of network traffic, or a condition at the edge device.

11. A system for generating a trusted timestamp comprising:
    a network of two or more nodes, wherein at least a time serving node is at a trusted time source and an edge node is at a local time source and the two or more nodes are configured to:
    (a) receive, at the edge node, a first time signal from the trusted time source at a first time;
    (b) transmit, by the edge node, a message back to the trusted time source at a second time, wherein the message comprises the first time and the second time;
    (c) determine a transmission latency between the trusted time source and the edge device based at least in part on the first time signal, the first time, the second time, and a third time at which the message is received by the trusted time source;
    (d) calculate a clock offset between the trusted time source and the local time source at the first time, wherein the clock offset is calculated based on the transmission latency determined in (c), the second time and the third time;
    (e) receive, at the edge node, the clock offset calculated in (d) and the transmission latency determined in (c) along with a hash code; and
    (f) generate, by the local time source at the edge node, a trusted timestamp for an event occurred at a fourth time, wherein the trusted timestamp is generated based at least in part on the clock offset and the fourth time.

12. The system of claim 11, wherein the trusted time source comprises a grandmaster clock receiving a GNSS or GPS time signal.

13. The system of claim 11, wherein the local time source is not synchronized to the trusted time source.

14. The system of claim 11, wherein the edge node is further configured to record the hash code to a ledger.

15. The system of claim 14, wherein the time serving node or the edge node is further configured to record a location of the event and an identity of the event to the ledger.

16. The system of claim 15, wherein the location of the event is proved based at least in part on a transmission latency between a node requesting the timestamp and the edge node.

17. The system of claim 11, wherein the two or more nodes are further configured to receive a request for generating a timestamp to timestamp an event occurred at a fifth time, and determine an estimated clock offset for generating a trusted second timestamp for the event occurred at the fifth time.

18. The system of claim 17, wherein the estimated clock offset is an interpolated or extrapolated value based on two or more previously calculated clock offsets.

19. The system of claim 17, wherein the estimated clock offset is determined using a machine learning algorithm trained model without requiring time signals from the trusted time source at the second time.

20. The system of claim 17, wherein the estimated clock offset is determined based at least in part on a condition of network traffic, or a condition at the edge node.

* * * * *